United States Patent [19]

Hensgen et al.

[11] Patent Number: 4,935,134
[45] Date of Patent: Jun. 19, 1990

[54] FILTER HOUSING OF SYNTHETIC MATERIAL

[75] Inventors: Heinz-Ulrich Hensgen, Linsengericht; Ulrich Otto, Mühlheim, both of Fed. Rep. of Germany

[73] Assignee: Pall Deutschland GmbH, Dreieich/Frankfurt, Fed. Rep. of Germany

[21] Appl. No.: 267,136

[22] Filed: Nov. 4, 1988

[30] Foreign Application Priority Data

Nov. 6, 1987 [DE] Fed. Rep. of Germany ... 8714819[U]

[51] Int. Cl.$^5$ .............................................. B01D 35/30
[52] U.S. Cl. .................................... 210/232; 210/444; 210/447; 55/502; 55/503
[58] Field of Search ............... 210/232, 440, 443, 445, 210/444, 446, 447; 55/490, 502, 503

[56] References Cited

U.S. PATENT DOCUMENTS

| | | | |
|---|---|---|---|
| 2,068,837 | 1/1937 | Aronson | 210/445 |
| 2,153,664 | 4/1939 | Freedlander | 210/445 |
| 2,696,818 | 12/1954 | Van Loghem | 210/445 |
| 3,421,631 | 1/1969 | Hirsch | 210/445 |
| 3,794,180 | 2/1974 | Blocker | 210/445 |
| 3,923,663 | 12/1975 | Reid | 210/443 |
| 3,950,251 | 4/1976 | Hiller | 210/443 |
| 4,728,421 | 3/1988 | Moddemeyer | 210/232 |

Primary Examiner—W. Gary Jones
Assistant Examiner—Wanda L. Millard
Attorney, Agent, or Firm—Banner, Birch, McKie & Beckett

[57] ABSTRACT

A filter housing of synthetic material having a housing head (1) with an inside of synthetic material having an inlet part (3), an outlet part (2) and a cylindrical connector part (b 4) having an outwardly threaded neck (9) and a sealing surface (12), the housing portion (5) having an inside of synthetic material and an open end including a ring-shaped projection (13) and a sealing element (14), the filter housing further having a removable union nut (6) removably engaging the threaded neck (9) of the cylindrical connector part (4) and the ring-shaped projection (13) of the housing portion (5), wherein the inlet part (3) and the outlet part (2) are each cylindrical in form and each have an outwardly threaded neck (7, 8) and a ring-shaped groove (10, 11) in the edge for receiving an elastic sealing element.

14 Claims, 1 Drawing Sheet

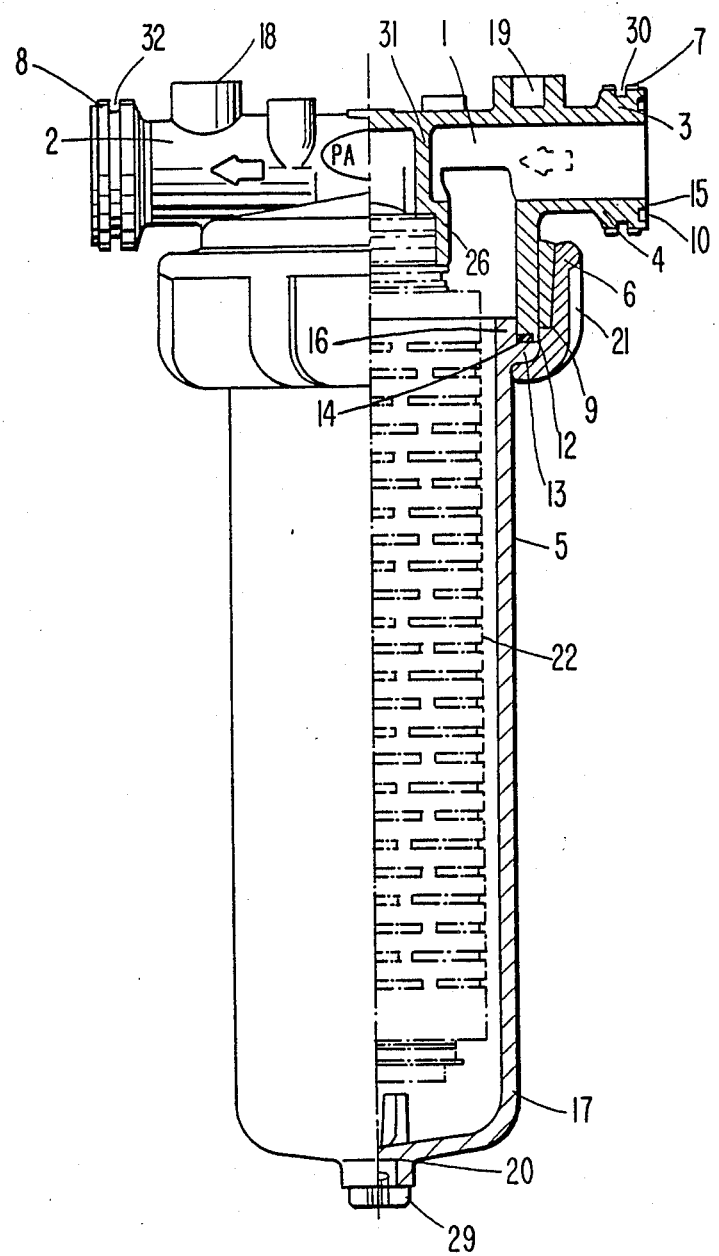

FILTER HOUSING OF SYNTHETIC MATERIAL

The present invention relates to a housing of synthetic material, and in particular to a synthetic or plastic housing for transporting and filtering electronic chemicals, for filtering in water treatment and electroplating.

Housings or casings of synthetic material are known in which parts of the housing come into contact with the product flow, but are not passed by the flow. These housing portions or regions are for example threads, sealing slits, acute-angled inside corners and the like, which contact the product. An undefined dead space arises which can take up and give off contaminating particles.

Conic or parallel inner threadings are also known with an inlay of sealing material (bands or pastes), into which threaded necks or tubes are screwed. The sealing is insufficient and impure.

Further, matched threadings are known which hold a sealing ring. When the parts are screwed together a shearing force is exerted on the sealing ring, which can damage it.

The object of the present invention is to provide a housing of synthetic material which can be securely sealed and avoids the above-mentioned disadvantages.

In accordance with the present invention a housing of synthetic material is provided as defined in claim 1. Preferred embodiments are specified in the dependent claims.

The present invention resides in a housing of synthetic material having an inside surface of synthetic material. The housing of plastic or synthetic material consists of a housing head and a housing portion which is removeably secured to the housing head by the means of a connecting element. The housing head has an inlet part and an outlet part, to which a suitable inlet or outlet line can be connected. The sealing region of the inlet and outlet part with such lines lies within the region defined by the surrounding fastener. Thus, the product flow can not come into contact with the fastener (e.g. a threaded neck) and a dead space is effectively avoided.

In addition, the housing can be more readily flushed as housings in the art. The connection of the housing head and the housing portion is preferably so configured that the circular sealing surface goes over into a region lying radially outward, which is in contact with the fastener. The inventive housing of synthetic material is therefore preferably free of dead spaces, i.e. inner regions are not created when providing the flow regions for the fluid, which serve the flow.

The sealing regions are restricted to a minimum by the design of the plastic housing. This makes an improved quality inspection of the regions or surfaces to be controlled possible. Simultaneously, an optimal sealing region is achieved which is contructively so disposed that the critical surface protects itself (retracting the sealing plane from the operational plane). In particular, no dead space is present on the pure or clean side of the plastic housing, i.e. on the outlet part of the housing head. Through this, a hazardfree outlet is made possible, in particular when transporting highly aggressive media.

The inlet part and outlet part of the housing head are preferably cylindrical and the threaded necks serve as fasteners for these parts, which are provided on the circumference of the inlet and outlet part. The sealing surfaces between the inlet or outlet part and a possible connector line is present in the form of a ring-shaped groove or recess, which receives an elastic sealing ring, for example an O-ring. Such a sealing element can compensate angular mismatch of the connector line (piping) and radial forces arising when being screwed on. For securement, outer union nuts are provided which connect the possible connector line with the threaded necks of the inlet or outlet part. The sealing ring is compressed in the groove and securely seals the connection slit.

The use of a union nut insures that no shearing forces act on the sealing ring which could destroy it. The sealing ring is only urged in axial direction. In particular, the ring-shaped groove in the base of the inlet part, outlet part and connector part, defines a suitable maximal pressure for the inserted sealing element when connection lines are attached to the inlet part or outlet part of the housing head or when the housing portion with its ring-shaped fastening piece rests against the connector part of the housing head. Thus it is guaranteed that the same seal pressure always exists when pressing the sealing element.

The connector part of the housing head is also preferably provided with an outwardly threaded neck and has a cylindrical form. The housing portion has a ring-shaped projection, ring flange or sleeve which can be engaged by a union nut for securement with the threaded neck of the connector part. This screw assembly insures a secure sealing and exerts only lateral compression forces on the sealing ring, whereby housing head and housing portion are not rotated with respect to one another during assembly. This increases the operational safety. The reception of the elastic sealing element in the ring-shaped projection of the housing portion provides the correct positioning and the seal can not be lost, i.e. the plastic housing can not lose the sealing element in neither standing nor in an inclined position. Also when dismantling the housing portion, the sealing element is arranged so that it can not be lost, i.e. it is held in a groove having, as seen from the groove opening, a slightly widened back space, into which the O-ring expands, being urged by the groove opening.

The union nut preferably has a conic threading and therefore is very easily actuated. When screwing off from the threaded neck, the thread carries only after the last rotation and thus makes easy removal of the nut possible.

The ring-shaped groove located in the faces of the inlet part and the outlet part are preferably separated from the inside of the housing head by a narrow bridge. Thus the sealing slit is reduced to a minimal length and width.

The housing head preferably has openings in the region of the inlet part and outlet part serving to vent and drain the housing head. In addition, an opening is provided at the lowest lying position of the housing portion which serves for draining the housing and effectively avoiding all kinds of sump formation after filtration.

The housing portion 5 preferably has the form of a bell, in which a filter for electronic chemicals is employed. It can be a simple injection molded part and where possible, has no internal tension. It is further preferred that the union nut consists of a glass fiber reinforced material or a highly stable material, which is much more rigid than the housing head or the housing portion. Therefore, it supports the plastic parts, namely the housing head and the housing portion. The union nut, apart from accepting the closing forces, also accepts the circumferential forces which occur when putting the two pieces together. The union nut does not contact the product. The construction of the housing of synthetic material requires a reduced amount of material. Only those zones of the housing are provided with thicker layers of material, where mechanical load must be carried. An optimal use of material is achieved in the regions not carrying tension.

The housing head, housing portion and the connector element preferably consist completely of synthetic material.

Polypropylene, glass fiber reinforced polypropylene, PVDF, TFA (Hoechst) or PFA (Du Pont) are foreseen as the material for the synthetic housing. These materials have different shrinkage factors. Since the dimension of the housing portion inserts or filters have a very narrow tolerance, also for different material, and since a uniform alignment in the housing portion is required, for housing of various materials, a tool selection is made for producing the synthetic housing, which makes the same defined seating always possible even for different shrinkage processes.

Different housing portions are foreseen to be secured to the housing head. Further advantages, features and embodiments of the present invention can be taken from the following description in connection with the drawing.

FIG. 1 shows a side view of the housing of synthetic material according to the invention, partially in section.

The synthetic housing consists of a housing head 1, a housing portion 5 and a removable connector element 6. Housing head 1 comprises an outlet part 2 representing the pure or clean side of the synthetic housing. A connecting line, for example a plastic pipe, can be connected to the outlet part 2 for transporting a fluid. The connection is made by means of an attached or cut threaded neck 9, which is provided on the circumference of the outlet part 2. Suitable union nuts are used for fastening, which urge a flange located on the connecting line against the outlet part. A ring-shaped groove 10 is provided on the face of the outlet part, which receives a sealing element, also ring-shaped. When the connecting line rests against the outlet part, the sealing element seals the resulting connection slit against fluid release. A circular groove 30 is cut into the threaded neck, which serves to seal the connection and secure the screwing, for example after pre-wetted or tested elements have been built in. The circular groove 10 is separated from the inside of the outlet part 2 by a narrow bridge 15. An opening 19 is also provided in the region of the outlet part, which serves to drain or vent the outlet part. The opening 19 can be sealed by a closure element in a threaded bore. The inlet part 3 of the housing head 1 has an analogous design. To secure a possible connecting line, for example a plastic pipe, a threaded neck 8 is provided and also a ring-shaped groove (not shown) corresponding to the groove 10. An opening 18 is provided corresponding to the opening 19. A groove 32 corresponding to the groove 30 is also formed. The opening 18 can also be closed by a closure element in a threaded bore. Outlet part and inlet part are separated by a bridge or ridge 31, so that a flowing fluid can only reach the outlet part through the housing portion 5 removably connected to the housing head. The housing head 1 has a connector part 4 arranged to the side, providing the connection to the exchangeable housing portion 5. A holder 26 for the head of a filter element 22 is provided in the synthetic housing. The holder 26 is preferably connected to the housing head, namely through the bridge 31 being integrally formed with the holder 26. The holder defines the connection of the inlet part 3 with the inside of the housing portion 5 and the connection of the outlet part 2 with the outer region of the housing portion 5. A groove 12 is provided on the face of the connector part 4 which receives a sealing element 14. A threaded sleeve 9 is applied to or cut into the circumference of the connector part, providing threading for the removable union nut 6. The housing portion 5 has the form of an elongated bell into which the filter element 22 projects, which is secured to the housing head by means of the holder 26. The filter element is formed with one side being closed. The housing portion 5 has a ring-shaped projection or ring flange 13 which is engaged by the union nut 6 to secure the housing portion 5 on the housing head 1. The union nut 6 has suitable ridges or ribs 21 which can be engaged with a plastic ring wrench to screw on or screw off the union nut 6. The securement of the housing portion 5 is made with the ring-shaped projection 13 which is suitably arranged on the end 16 of the housing portion. The ring-shaped projection can be displaced from the edge of the end 16, as shown. The housing portion 5 has a lower end 17, whose surface is curved convexly or is cone shaped. An opening 20 is formed on the lower end 17 for draining or cleaning the housing portion 5, which can be sealed by means of a closure 29. A wall fixture, for example an angle iron is preferably provided to secure the synthetic housing to a wall. Screws suitable for synthetic materials are used to secure to the wall fixture. These screws have sharp edges and have a self-cutting property and guarantee a connection, in particular at the contact surface, which is protected against temperature influences, in particular against expansion or shrinkage.

We claim:
1. Filter housing of synthetic material comprising
   (a) a housing head (1) having an inside of synthetic material, comprising an inlet part (3), an outlet part (2) and a cylindrical connector part (4) having an outwardly threaded neck (9) and a sealing surface (12);
   (b) a housing portion (5) having an inside of synthetic material and an open end including a ring-shaped projection (13) and a sealing element (14);
   (c) a removable union nut (6) removably engaging the threaded neck (9) of the cylindrical connector part (4) and the ring-shaped projection (13) of the housing portion (5), wherein the housing portion (5) is securable to the housing head (1), so that the sealing element (14) rests on the sealing surface (12) of the connector part (4);
   characterized in that the inlet part (3) and the outlet part (2) are each cylindrical in form and each have an outwardly threaded neck (7, 8) and a ring-shaped groove (10, 11) in an edge for receiving an elastic sealing element.

2. Filter housing in accordance with claim 1, characterized in that the housing head (1) is configured and so connected to the housing portion (5), that a flow connection for the fluid flow from the inlet part (3) to the outlet part (2) only exists through the housing portion.

3. Filter housing in accordance with claim 1, characterized in that the housing head (1) comprises a support (26) which extends to the inside of the housing portion (5) and is connected to the outlet part (2) by a flow channel in the housing head (1).

4. Filter housing in accordance with claim 2 or 3, characterized in that the inside of the synthetic housing is configured and divided into two inner sections by a filter element (22), namely into a clean section and inlet section, so that fluid from the inlet part (3), which makes possible the inlet of fluid into the inlet section, can only flow through the filter element to the clean section and to the outlet part (2), which makes possible the outlet of fluid from the clean section.

5. Filter housing in accordance with claim 4, characterized in that the filter element substantially is formed as a cylinder closed on one side, which is arranged in the housing portion substantially concentric thereto, that the housing head (1) has a support (26) for mounting the filter element (22) with its open end, and that in the housing head (1) is provided a first fluid flow connection between the inlet part (3) and the annular space between the filter element (22) and the inside of the housing portion (5) and a second fluid flow connection between the outlet part (2) and the inside of the support (26).

6. Filter housing in accordance with claim 1, characterized in that the sealing surface has the form of a ring-shaped recess (12) formed in the edge of the cylindrical connector part (4), which serves to receive the sealing element (14).

7. Filter housing in accordance with claim 1, characterized in that the union nut (6) has a conic threading.

8. Filter housing in accordance with claim 1, characterized in that the ring-shaped groove (10, 11) is separated from the inside of the housing head (1) by a narrow bridge (15).

9. Filter housing in accordance with claim 1, characterized in that the housing head (1) has a further opening (18 or 19) in the region of its inlet part (3) and its outlet part (2) respectively.

10. Filter housing in accordance with claim 1, characterized in that the housing portion (5) has a further opening (20) on its lowest-lying position (17) which is closed by a closure (29).

11. Filter housing in accordance with claim 1, characterized in that the housing portion (5) has the form of a bell.

12. Filter housing in accordance with claim 1, characterized in that the union nut (6) consists of a glass fiber reinforced material.

13. Filter housing in accordance with claim 1, characterized in that the housing head (1), the housing portion (5) and the connector element (6) consist completely of synthetic material.

14. Filter housing in accordance with claim 1 characterized in that said filter housing further comprises two union nuts for securing the threaded necks.(7, 8) of the inlet part (3) and the outlet part (2) to inlet and outlet connector lines, respectively.

* * * * *